(12) United States Patent
Fallgren et al.

(10) Patent No.: US 11,447,429 B2
(45) Date of Patent: Sep. 20, 2022

(54) METHODS AND SYSTEMS FOR ELECTROCHEMICALLY INCREASING BIOREACTIVITY OF CARBONACEOUS GEOLOGICAL MATERIALS

(71) Applicant: Advanced Environmental Technologies, LLC, Fort Collins, CO (US)

(72) Inventors: Paul H. Fallgren, Fort Collins, CO (US); Song Jin, Fort Collins, CO (US)

(73) Assignee: Advanced Environmental Technologies, LLC, Fort Collins, CO (US)

( * ) Notice: Subject to any disclaimer, the term of this patent is extended or adjusted under 35 U.S.C. 154(b) by 0 days.

(21) Appl. No.: 17/285,634

(22) PCT Filed: Oct. 18, 2019

(86) PCT No.: PCT/US2019/057064
§ 371 (c)(1),
(2) Date: Apr. 15, 2021

(87) PCT Pub. No.: WO2020/082022
PCT Pub. Date: Apr. 23, 2020

(65) Prior Publication Data
US 2021/0380500 A1 Dec. 9, 2021

Related U.S. Application Data

(60) Provisional application No. 62/747,164, filed on Oct. 18, 2018.

(51) Int. Cl.
*C05F 11/06* (2006.01)
*C25B 3/20* (2021.01)
(Continued)

(52) U.S. Cl.
CPC ............. *C05F 11/06* (2013.01); *C25B 3/20* (2021.01); *C25B 9/65* (2021.01); *C25B 11/04* (2013.01); *C25B 15/081* (2021.01); *C05F 17/90* (2020.01)

(58) Field of Classification Search
None
See application file for complete search history.

(56) References Cited

U.S. PATENT DOCUMENTS

| | | |
|---|---|---|
| 4,430,175 A | 2/1984 | Kreysa et al. |
| 5,846,393 A | 12/1998 | Clarke et al. |
| | (Continued) | |
| 6,270,650 B1 | 8/2001 | Kazi et al. |

FOREIGN PATENT DOCUMENTS

| | | |
|---|---|---|
| AU | 2019360152 B2 | 7/2021 |
| WO | 2011075163 A1 | 6/2011 |
| | (Continued) | |

OTHER PUBLICATIONS

Farooque "Novel Electrochemical Process for Coal Conversion", DOE report, 1989 (Year: 1989).*
(Continued)

*Primary Examiner* — Wojciech Haske
(74) *Attorney, Agent, or Firm* — Santangelo Law Offices, P.C.

(57) ABSTRACT

Embodiments of the present invention may provide methods and systems for enhancing bioreactivity of carbonaceous geological material (11) which may include adding carbonaceous geological material to an electrochemical treatment (18) and creating acidic and basic pH levels, peroxides, and radicals (5) which can increase biochemical reactivity, bioavailability, and water solubility of the carbonaceous geological material to provide a reactive carbonaceous geological material (14).

49 Claims, 9 Drawing Sheets

(51) Int. Cl.
    *C25B 11/04*      (2021.01)
    *C25B 15/08*      (2006.01)
    *C25B 9/65*      (2021.01)
    *C05F 17/90*      (2020.01)

(56) References Cited

U.S. PATENT DOCUMENTS

| | | |
|---|---|---|
| 2010/0081184 A1 | 4/2010 | Downey et al. |
| 2013/0025188 A1 | 1/2013 | Cheiky et al. |
| 2013/0059358 A1 | 3/2013 | Downey et al. |
| 2016/0200634 A1 | 7/2016 | Zaseybida et al. |
| 2016/0311728 A1 | 10/2016 | Swensen et al. |
| 2017/0362135 A1 | 12/2017 | Malyala et al. |

FOREIGN PATENT DOCUMENTS

| | | |
|---|---|---|
| WO | 2011142809 A1 | 11/2011 |
| WO | 2020082022 A1 | 4/2020 |

OTHER PUBLICATIONS

International PCT Application No. PCT/US2019/57064, filed Oct. 18, 2019. First Named Inventor: Fallgren.
International PCT Application No. PCT/US2019/57064, filed Oct. 18, 2019. First Named Inventor: Fallgren. Search Report dated Jan. 16, 2020. 2 pages.
International PCT Application No. PCT/US2019/57064, filed Oct. 18, 2019. First Named Inventor: Fallgren. Written Opinion of the International Searching Authority dated Jan. 16, 2020. 9 pages.
International PCT Patent Application No. PCT/2019/057064, filed Oct. 18, 2019. First Named Inventor: Fallgren. International Report on Patentability dated Oct. 21, 2020. 13 pages.
Parallel Australian Patent Application No. 2019360152, Examination Report No. 1 dated May 18, 2021. 4 pages.
Parallel Australian Patent Application No. 2019360152, Notice of acceptance of your patent application dated Jul. 14, 2021. 4 pages.
Parallel Australian Patent No. 2019360152, Certificate of Grant Standard Patent dated Nov. 11, 2021. 1 page.
Parallel Canadian Patent Application No. 3116579, Requisition by Examiner dated May 31, 2021. 4 pages.
Park, Elecliochemistry of Carbonaceous Materials and Coal. J. Electrochem. Soc., 131 (1984) 363C. 11 pages.
Parallel Canadian Patent Application No. 3116579, Requisition by Examiner dated Nov. 24, 2021. 4 pages.
Parallel Canadian Patent Application No. 3116579, Commissioner's Notice—Application Found Allowable dated Apr. 7, 2022. 1 page.

\* cited by examiner

I  II  III  IV
FIG. 5  FIG. 6  FIG. 7  FIG. 8

METHODS AND SYSTEMS FOR ELECTROCHEMICALLY INCREASING BIOREACTIVITY OF CARBONACEOUS GEOLOGICAL MATERIALS

PRIORITY CLAIM

This application is the United States National Phase of PCT patent application no. PCT/US2019/057064 filed Oct. 18, 2019, which claims priority to and the benefit of U.S. Provisional Application No. 62/747,164 filed Oct. 18, 2018, both above-mentioned applications hereby incorporated by reference herein in their entirety.

TECHNICAL FIELD

Embodiments of the present invention relate to electrochemical technology for treating carbonaceous geological materials. More specifically, embodiments of the present invention may relate to the utilization of electrochemical reactions and resulting pH and redox conditions to increase the reactivity and bioavailability of coal or other carbonaceous geological materials for biological and biochemical reactions and production of beneficial substances.

BACKGROUND

Carbonaceous geological materials, such as coal, shale, organic sedimentary rocks, or the like can be chemically or even biochemically modified or even converted to forms that are beneficial to humans and the environment. Biochemical coal conversion and other processing technologies include coal biogasification, biomethanation, coal biosolubilization, coal to chemicals, or the like. These technologies may be limited by low reactivity and perhaps even by low bioavailability of coal compounds. This may be due to the complex structure and bonding of coal compounds and even the hydrophobic properties of coal. Pre-treatments such as mixing coal with oxidants, chelators, acids, bases, and solvents have been used in the past; however, these chemical pre-treatments are materially intensive. Another pre-treatment method may involve thermal heating methods including hot air flushing or even steam flushing; however, these thermal treatments are energy intensive.

Soil health and plant/crop growth may be dependent on the presence and even maintenance of soil organic matter, nutrient cycling and retention, and perhaps even water retention. Biochemically converted coal compounds can provide these benefits for enhancing soil health and plant/crop growth when added to soil; however, biochemical conversion of coal by itself is challenging. The electrochemical treatment of coal perhaps followed by biochemical treatment may convert coal or other carbonaceous geological material into beneficial products by eliminating or even substantially reducing these challenges. There may be a high potential for the electrochemical treatment of coal followed by direct application to soils to enhance soil health, perhaps where microbial degradation of the coal could be enhanced by the increased bioreactivity of the coal.

Embodiments of the present invention may utilize electrochemical reactions to directly break-down coal structure and significantly increase biochemical reactivity and bioavailability of coal compounds; and perhaps even to further solubilize coal or produce intermediate compounds which may increase biochemical reactivity and bioavailability of coal compounds.

DISCLOSURE OF INVENTION

The present invention includes a variety of aspects, which may be selected in different combinations based upon the particular application or needs to be addressed. It is an aspect of the present invention, in embodiments, to provide a method and process to increase biochemical reactivity of coal or other carbonaceous geological materials by electrochemical treatment.

It is an aspect of the present invention, in embodiments, to provide a method and process to increase biochemical reactivity of coal or other carbonaceous geological materials by enhancing the breakdown of coal structure and compounds by anodic reactions.

It is another aspect of the present invention, in embodiments, to provide a method and process to increase the biochemical reactivity of coal by enhancing the breakdown of coal or other carbonaceous geological material structure and increasing solubility by cathodic reactions.

It is an aspect of the present invention, in embodiments, to provide a method and process to electrochemically enhance mineral reactions with coal or other carbonaceous geological material to increase coal or other carbonaceous geological material biochemical reactivity.

It is yet another aspect of the present invention, in embodiments, to provide a method and process to convert electrochemically-treated coal or other carbonaceous geological material to soil and plant or crop growth enhancers.

Naturally, further objects, goals and embodiments of the inventions are disclosed throughout other areas of the specification, claims, and drawings.

MODE(S) FOR CARRYING OUT THE INVENTION

It should be understood that the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention may provide methods for enhancing bioreactivity comprising the steps of providing a carbonaceous geological material; adding said carbonaceous geological material to an electrochemical treatment; creating acidic and basic pH levels, peroxides, and radicals in said electrochemical treatment; increasing a biochemical reactivity, bioavailability, and water solubility of said carbonaceous geological material; and perhaps even creating a reactive carbonaceous geological material from said step of increasing said biochemical reactivity, bioavailability, and water solubility of said carbonaceous geological material. Other embodiments may include a bioreactivity enhancing system comprising an electrochemical treatment; a carbonaceous geological material in said electrochemical treatment; and perhaps even acidic and basic pH levels, peroxides, and radicals in said electrochemical treatment capable of producing a reactive carbonaceous geological material with increased biochemical reactivity, bioavailability, and water solubility of said carbonaceous geological material.

The present invention includes, in embodiments, methods and systems for increasing biochemical reactivity and bioavailability of carbonaceous geological materials (11) perhaps by an electrochemical treatment (18). This may include the application of direct current to at least two electrodes that may be located in a media with carbonaceous geological materials. The electrodes may be constructed from conductive materials that may include, but are not limited to, titanium, stainless steel, graphite, galvanized steel, copper, mixed metal oxides, metal oxides, carbon fiber, magnetite, any combination thereof, or the like. A direct current source may include, but is not limited to, alternating current to direct current converter, alternating current to direct current transformer, solar panels, batteries, wind turbine, fuel-powered generators, or the like. Carbonaceous geological materials (11) may include, but is not limited to, coal, peat, lignite, subbituminous coal, bituminous coal, anthracite, oil, shale, black shale, organic sedimentary rocks, or the like. The carbonaceous geological materials may be finely crushed, coarsely crushed, or between fine and course, and may even be dry, wet, mixed into a slurry with water or solutions, or the like. Electrochemical treatments may be conducted in batches or even continuously perhaps at different retention times.

Electrochemical reactions may occur within a media (7) which may be water-based media, water-solid mixture media, and aqueous solutions or the like, may result in electrolytic reactions that can change properties of the media. Anodic reactions are oxidative and generates protons ($H^+$) resulting in acidic pH levels. Cathodic reactions are reductive and generates hydroxide ($OH^-$) resulting in basic pH levels. Breakdown and transformation of coal structure may be known to occur at acidic pH levels, while coal swelling and solubilization may be known to occur at basic pH levels. Such treatment can increase the biochemical reactivity and bioavailability of carbonaceous geological materials. Increasing biochemical reactivity, bioavailability, and water solubility may result in any one or more of the following: swelling a carbonaceous geological material with a basic pH; solubilizing a carbonaceous geological material with a basic pH; breaking down a carbonaceous geological material with a peroxide; transforming a carbonaceous geological material with a peroxide; breaking down a carbonaceous geological material with radicals; transforming a carbonaceous geological material with said radicals or may even include broken down carbonaceous geological material with an acidic pH; transformed carbonaceous geological material with an acidic pH; swelled carbonaceous geological material with a basic pH; solubilized carbonaceous geological material with a basic pH; broken down carbonaceous geological material with a peroxide; transformed carbonaceous geological material with a peroxide; broken down carbonaceous geological material with radicals; and perhaps even transformed carbonaceous geological material with radicals.

Embodiments of the present invention may rely on electrochemical mechanisms to create acidic and basic pH perhaps simultaneously in an influenced realm of anode and cathode, respectively, without the need of adding any acids or bases as in other prior methods. Embodiments may provide creating acidic and basic pH levels, peroxide, and radicals perhaps even simultaneously creating acidic and basic pH levels, said peroxide and said radicals in an electrochemical treatment such that a simultaneously created acidic and basic pH levels, peroxide, and radicals may be achieved in an electrochemical treatment. Reactive carbonaceous geological material may be created without having to add any acids bases, peroxide, or radicals to the carbonaceous geological material.

In embodiments, a polarity of an electrode can be switched in an electrochemical treatment such that a treatment may be capable of switching the polarity of an electrode. This can be done by changing the connection of the electrode from a negative terminal (41) to a positive terminal (42) or vice versa of a power source as may be understood from FIG. 6. Simple polarity switches can reverse the pH ranges near the electrodes perhaps to achieve a thorough treatment of coal, weaken its structure, generate a diversity of organic compounds, and even increase the biochemical reactivity and bioavailability of coal to microbes or the like.

Electrochemical treatments may provide reactive carbonaceous geological materials. These reactive carbonaceous geological materials may be processed perhaps with an additional process (15) such as a biochemical process. Additional processes that may utilize treated carbonaceous geological materials that may be called reactive carbonaceous geological material may include, but are not limited to, biogasification, biomethanation, acidification, biosolubilization, chemicals production, biochemicals production, biofertilizer production, soil amendments, organic fertilizer production, any combination thereof, or the like.

In embodiments, the present invention may provide that the reactive carbonaceous geological materials (14) may be added directly to soil perhaps providing a soil amendment (9). They may also be mixed with microbes and then added to soil in other embodiments.

Embodiments of the present invention may be used to break down the structure of carbonaceous geological materials perhaps adding them to an electrochemical treatment (18). In an electrochemical treatment, acidic and basic pH levels, peroxides, and radicals (5) may be created in a media of a treatment. Peroxide and radicals may include but are not limited to hydroxyl radicals, sulfate radicals, superoxide, organic radicals, inorganic radicals, hydrogen peroxide, inorganic peroxides, organic peroxides, any combination thereof, or the like. The breakdown of the structure of carbonaceous geological materials may be by the application of anodic reactions. Anodic reactions may include, but are not limited to, electrolysis, direct oxidation, acidification, reactions associated with acidic pH, or the like. Anodic reactions may reduce the pH of a medium perhaps to levels ranging from about 0.00 to about 6.99 pH for an acidic pH level.

Embodiments of the present invention may be used to break down the structure and even increase the solubility of carbonaceous geological materials perhaps by the application of cathodic reactions. Cathodic reactions may include, but are not limited to, electrolysis, direct reduction, absorption, reactions associated with basic pH, or the like. Cathodic reactions may increase the pH of a medium perhaps to levels ranging from about 7.01 to about 14.00 pH for basic pH levels.

Embodiments of the present invention may be used to activate or even to enhance mineral reactions (43) in an electrochemical treatment. Mineral reactions may assist in the production of peroxides and radicals in a media of an electrochemical treatment. Minerals may include, but are not limited to, iron oxides, iron sulfides, titanium dioxide, transition metal-containing substance, any combination thereof, or the like. The minerals may exist naturally in carbonaceous geological materials or may they may be added.

An electrochemical treatment (18) may occur in an electrochemical reactor (4) which may be an electrochemical stirred-tank reactor, a vessel, a single chambered vessel (35), a dual chambered vessel (8), or the like. An electrochemical reactor may include at least two electrodes (2) and a power source (3). In some embodiments, an electrochemical reactor may have at least four electrodes or more and may even have at least two power sources or more. When using four electrodes, two electrodes may be connected to a first power supply and the other two electrodes may be connected to a second power supply. A power source (3) may be a direct current source, an alternating current to direct current converter, an alternating current to direct current transformer, solar panels, batteries, wind turbine, fuel-powered generator, any combination thereof, or the like.

Figure 17:
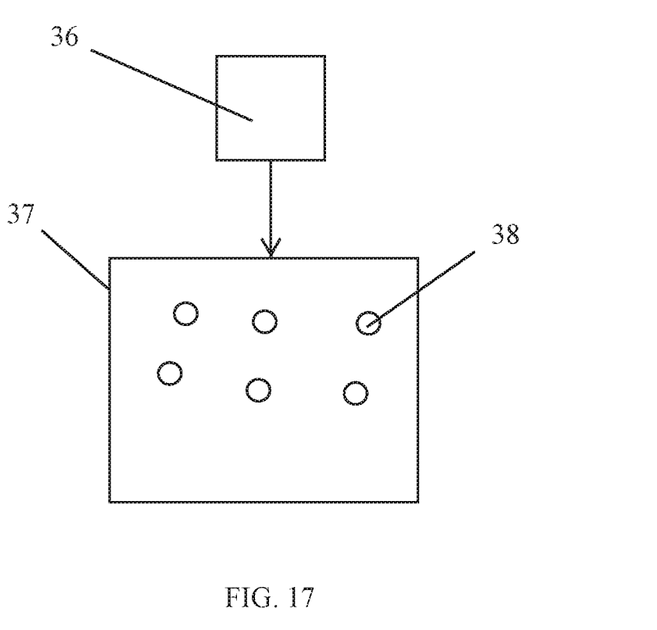
FIG. 17 shows a non-limiting example of a biomass containing bioreactor in accordance with some embodiments of the present invention.

Embodiments of the present invention may be used to convert carbonaceous geological material such as coal into a substance that may enhance soil health and even plant and crop growth by using a biochemical method following an electrochemical treatment. The electrochemical to biochemical method may include at least one electrochemical treatment process which may provide reactive carbonaceous geological material (14) and perhaps even one biochemical treatment process. In some embodiments, acidic and basic pH levels, peroxides, and radicals in an electrochemical treatment may be capable of producing a reactive carbonaceous geological material (14) perhaps with an increased biochemical reactivity, bioavailability, and water solubility of a carbonaceous geological material. A biochemical treatment (15) may provide a biochemically treated reactive carbonaceous geological material such as a soil amendment (9) or the like. A biochemical treatment may include the addition of carbonaceous geological material such as reactive carbonaceous geological material (36) to at least one bioreactor (37) which may be amended with biomass (38) as shown in FIG. 17. A bioreactor (36) may be a biomass containing bioreactor and may provide a condition perhaps different redox conditions such as but not limited to aerobic, facultative, anoxic, anaerobic, any combination thereof, or the like.

Figure 13:
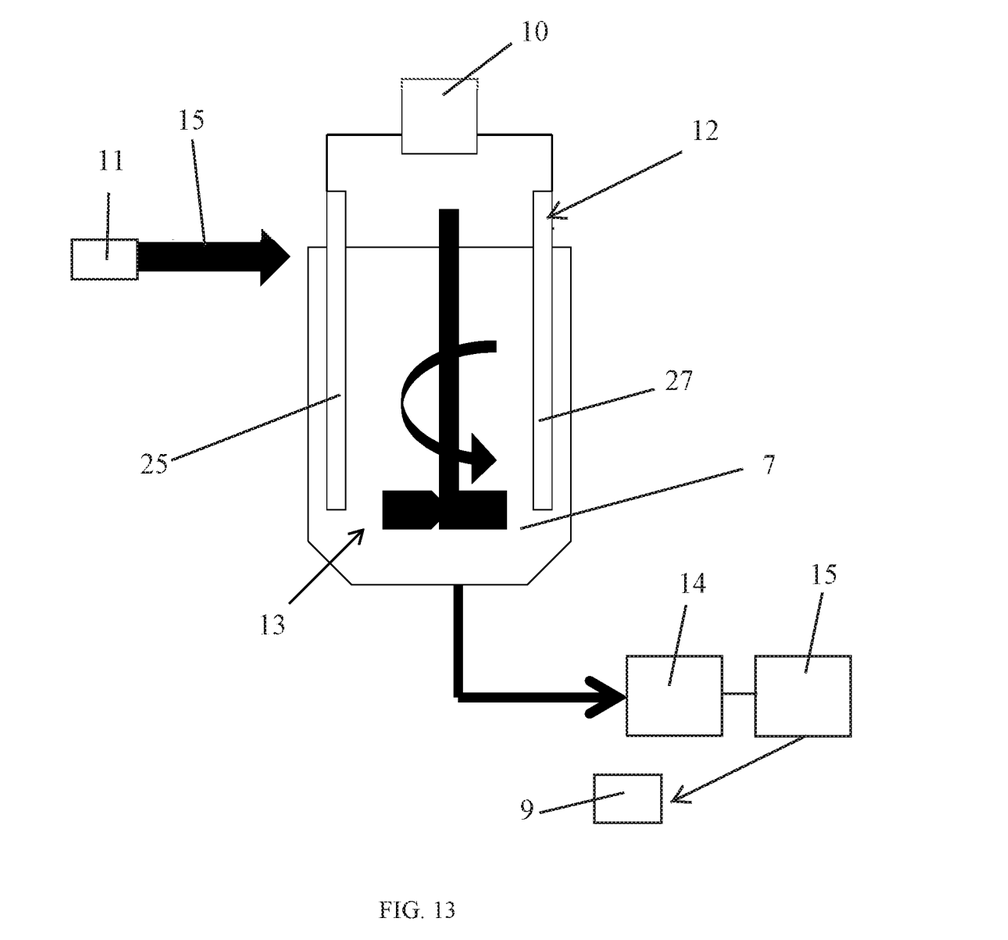
FIG. 13 shows a non-limiting example of an electrochemical stirred-tank reactor in accordance with some embodiments of the present invention.

FIG. 13 provides a non-limiting example of an electrochemical single-chambered stirred tank reactor which may be used for electrochemical treatment of carbonaceous geological material. A reactor may include, but is not limited to, media (7), an impeller (13) which may be a stirrer, and at least two electrodes (12), such as one anode (25) and one cathode (27). The electrodes may be connected to an electrical source (10) such as at least one alternating or even direct current electrical power source. Carbonaceous geological material (11) may be treated in the electrochemical reactor perhaps to provide a reactive carbonaceous geological material (14). In some embodiments, the reactive carbonaceous geological material may be added to a biochemical treatment (15) perhaps to complete conversion of carbonaceous geological material to a soil amendment (9) which may provide enhanced plant or even crop growth.

Figure 14:
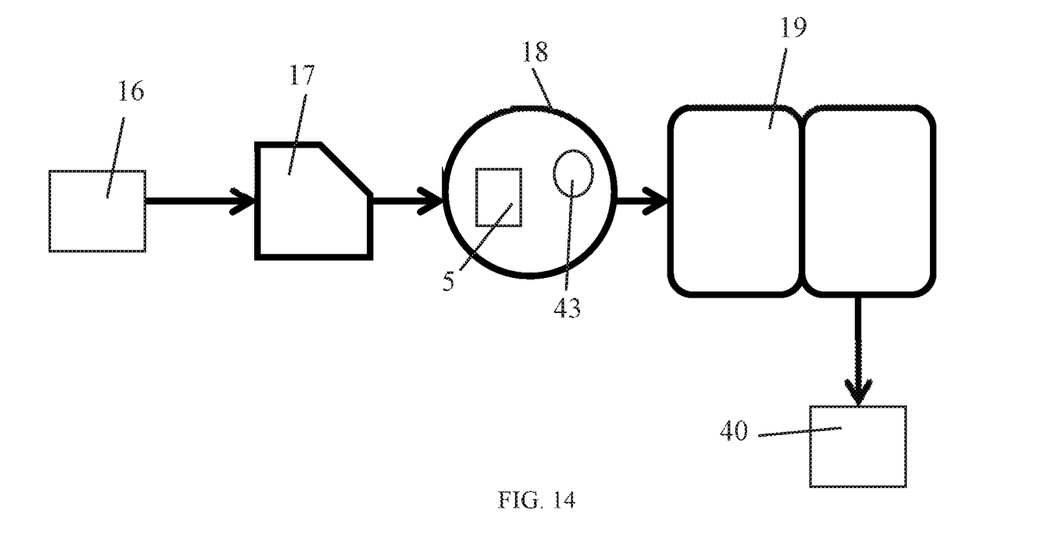
FIG. 14 shows a non-limiting example of an electrochemical to biochemical process for converting coal into a soil enhancer in accordance with some embodiments of the present invention.

FIG. 14 shows a non-limiting example of a process diagram for an electrochemical-to-biochemical coal conversion process to convert carbonaceous geological material into a soil amendment. Carbonaceous geological material (16) may be crushed perhaps in a crusher (17) such as by milling and may be treated by at least one electrochemical treatment (18). The treated carbonaceous geological material may be added to at least one biochemical treatment (19) to complete the conversion of carbonaceous geological material to a soil amendment (40).

Figure 15:
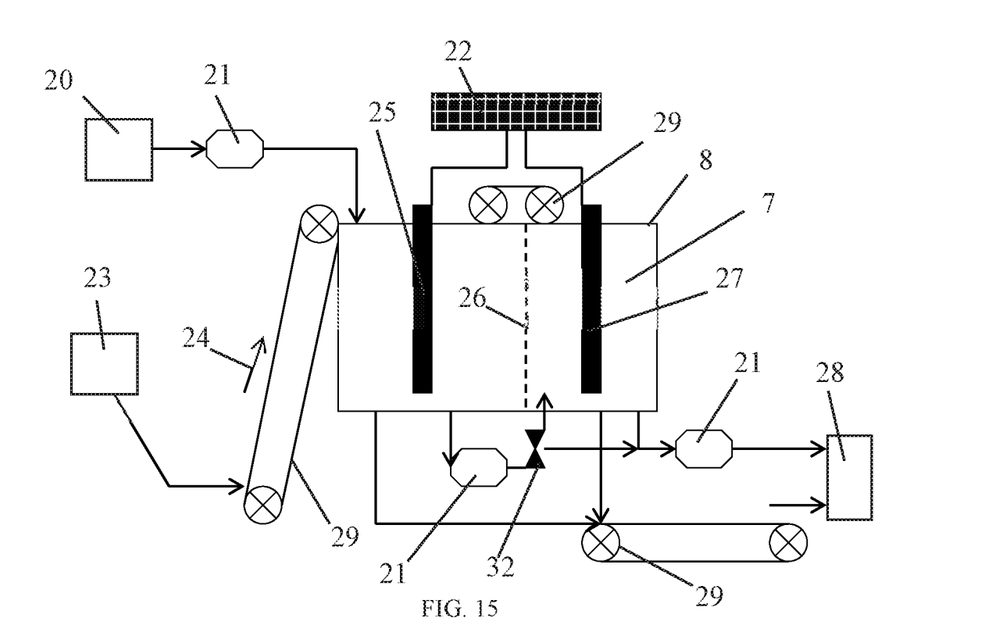
FIG. 15 shows a non-limiting example of an electrochemical coal treatment process in accordance with some embodiments of the present invention.

FIG. 15 shows a non-limiting example of an electrochemical treatment. Water (20) which may be a coal slurry may be introduced into a pump (21) which may be connected to a chamber (8) and may introduce water into the chamber. Carbonaceous geological material (23) such a coal or even thickened coal paste or the like may be introduced onto a conveyor (29) and conveyed (24) into a chamber. Conveyors (29) and pumps (21) may be used near the chamber or perhaps with the removal of substances from a chamber as shown in FIG. 15. A valve (32) may be used in a system. An energy source (22) such as a solar cell may be connected to at least two electrodes in a chamber. An energy source (22) may be connected to an anode (25) and a cathode (27) of a chamber. A chamber may have media (7) therein and may be a dual chamber (8) such as a chamber separated into two chambers perhaps where the electrodes of a system may be separated in each chamber. Chambers may be divided by a divider (26) and may be connected through a membrane separator or salt bridge. A membrane separator may include, but is not limited to, a proton exchange membrane, a cation exchange membrane, an anion exchange membrane, a membrane filter, or the like. A treatment process may be a batch, semi-batch, continuous process or the like. Such two-chambered electrochemical treatment may increase biochemical reactivity and even bioavailability of carbonaceous geological material.

Figure 16:
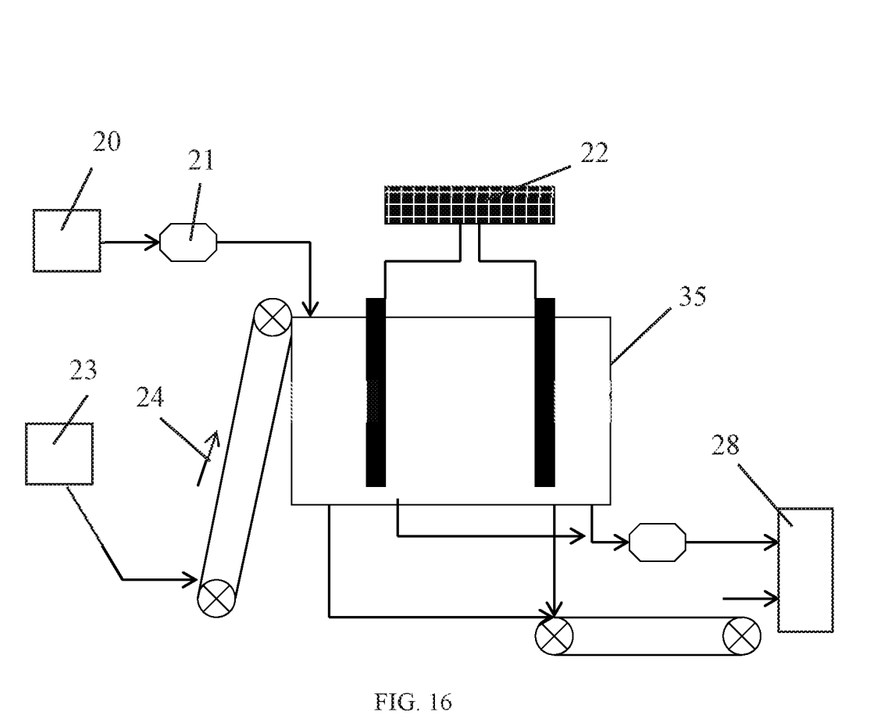
FIG. 16 shows a non-limiting example of an electrochemical coal treatment process in accordance with some embodiments of the present invention.

FIG. 16 is a non-limiting example of an electrochemical treatment using a single-chamber (35) which may be used to treat carbonaceous geological material for increased biochemical reactivity and bioavailability. The process may be a batch, semi-batch, continuous process, or the like.

EXAMPLE 1

Figure 1:
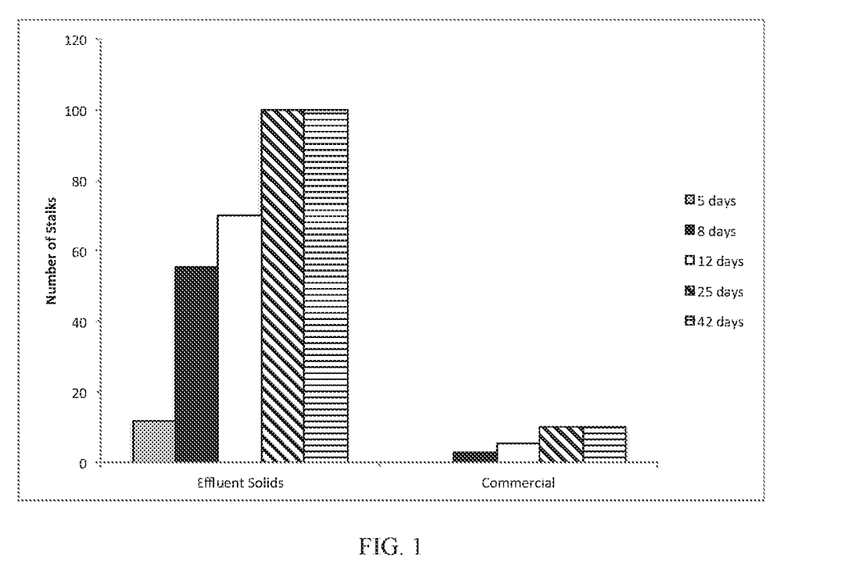
FIG. 1 shows a graph of the number of grass stalks grown in amended soil with treated coal as compared to commercial fertilizers in accordance with some embodiments of the present invention.
Figure 2:
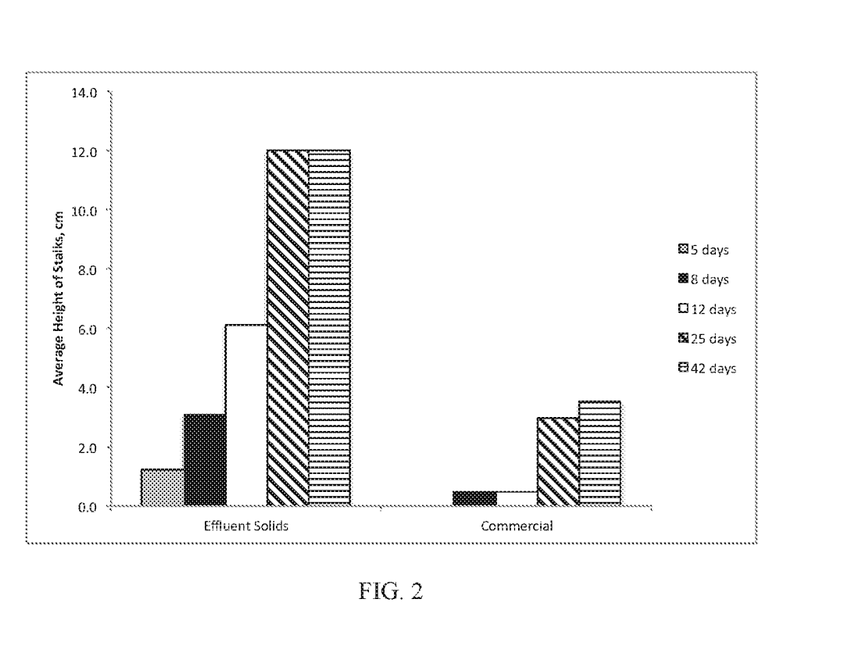
FIG. 2 shows a graph of the average height of grass stalks in amended soil with treated soil as compared to commercial fertilizers in accordance with some embodiments of the present invention.

Tests were conducted to compare the performance of the treated bioconverted coal (coal that has been treated with an electrochemical treatment and then treated with biochemical treatment) with commercial fertilizer for enhancing growth of grass in an arid soil. Growth tests data show substantially higher yields grass for arid soils amended with the converted coal when compared to commercial fertilizers. As shown in FIGS. 1 and 2, the number and average height of grass stalks were 10 and over 3 times higher, respectively, in soils amended with converted solids. FIG. 1 charts the number of grass stalks in soil amended with treated coal processed from a biochemical process (e.g., effluent solids) and in soil with a commercial fertilizer. FIG. 2 charts the average height of grass stalks in soil amended with treated coal processed from a biochemical process (e.g., effluent solids) and in soil with a commercial fertilizer (Grow More 20-20-20 NPK).

EXAMPLE 2

Figure 3:
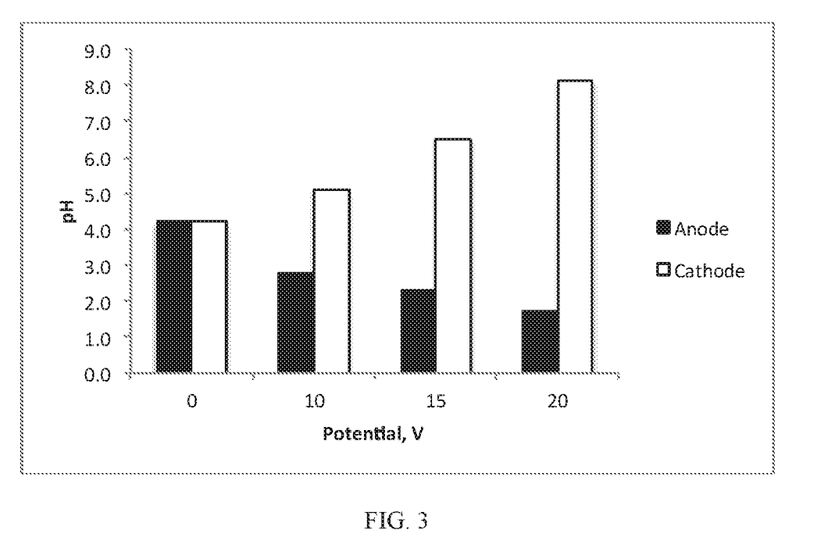
FIG. 3 shows a graph of the pH values of saturated coal at an anode and cathode of an electrochemical reaction in accordance with some embodiments of the present invention.
Figure 4:
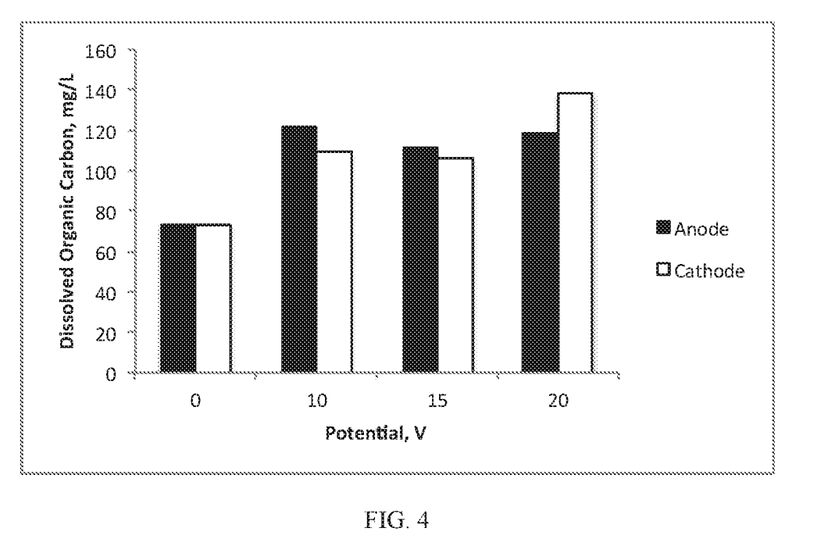
FIG. 4 shows a graph of dissolved organic carbon concentrations from saturated coal at an anode and cathode of an electrochemical reaction in accordance with some embodiments of the present invention.

To determine if electrochemical treatment of coal resulted in breakdown of coal into smaller, more bioavailable (e.g., soluble) compounds, a laboratory test was conducted, where crushed lignite in a test vessel was saturated with water and two electrodes were inserted into the coal. Different direct current potentials were applied to the electrodes for 30 minutes. As shown in FIG. 3, as the voltage increased, the pH decreased to stronger acidic levels (<about 3.0) at the anode after the application of direct current potential, while the pH increased to basic levels at the cathode. The dissolved organic carbon extracted from coal thereof increased at both electrodes with increasing direct current potential as understood from FIG. 4. FIG. 3 shows the pH values of saturated coal at the anode and cathode after application of different direct current potentials. FIG. 4 shows the dissolved organic concentrations extracted from saturated coal at the anode and cathode after application of different direct current potentials. These results may indicate that the application of direct current to coal can change chemical conditions within the coal-water mixture and may breaks down the coal structure to more bioavailable compounds.

EXAMPLE 3

Figures 5, 6, 7:
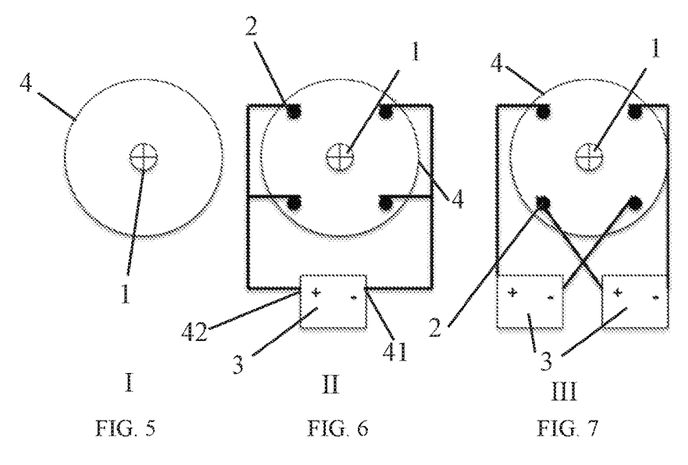
FIG. 5 shows a non-limiting example of a Configuration I of an electrochemical treatment reactor in accordance with some embodiments of the present invention.
FIG. 6 shows a non-limiting example of a Configuration II of an electrochemical treatment reactor in accordance with some embodiments of the present invention.
FIG. 7 shows a non-limiting example of a Configuration III of an electrochemical treatment reactor in accordance with some embodiments of the present invention.
Figure 8:
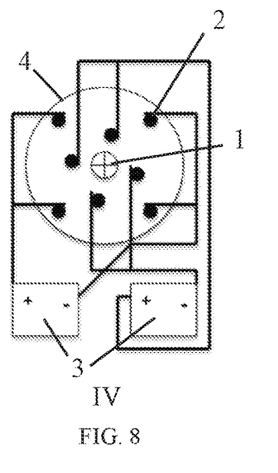
FIG. 8 shows a non-limiting example of a Configuration IV of an electrochemical treatment reactor in accordance with some embodiments of the present invention.

To determine electrode spacing and configuration for an electrochemical treatment perhaps using a stirred reactor for treating and increasing bioreactivity of carbonaceous geological material, bench-scale reactor tests were conducted using the configurations as shown in FIGS. 5-8 showing Configurations I, II, III, and IV. Configuration I as shown in FIG. 5 provides an example of an electrochemical reactor (4) that may be stirred by an impeller (1) without any electrodes. Configuration II in FIG. 6 shows an example of an electrochemical reactor (4) that may be stirred by an impeller (4) with four electrodes (2) each at different locations in the reactor. The electrodes (2) may be singled, in bundles or even sets, or the like. One set of the two electrodes may be connected to an electrical power supply (3) at one polarity and the other set of electrodes may be connected to an opposite polarity. In Configuration III shown in FIG. 7, an electrochemical reactor (4) may be stirred by an impeller (1) with four electrodes (2) (e.g., single, bundles, or sets, or the like) in perhaps four different locations in the reactor. Two electrical power supplies (3) may be used to apply electrical potentials to the electrodes, where one set of electrodes may be connected to one electrical power supply, but at opposite polarities, and the other set of electrodes may be connected to the other electrical power supply. In Configuration IV as shown in FIG. 8, an electrochemical reactor (4) may be stirred by an impeller (1) with eight electrodes (2) (e.g., single, bundles, or sets or the like) in eight different locations in the reactor. Four electrodes may cover an area near a reactor wall, while the other four electrodes may cover an area near an impeller. Two electrical power supplies (3) may be used to apply electrical potentials to the electrodes, where one power supply may connect to the electrodes near a reactor wall and the other power supply may connect to the electrodes near an impeller. Each power supply has a set of two electrodes connected to one polarity and the other set of electrodes are connected to the opposite polarity.

Figure 9:
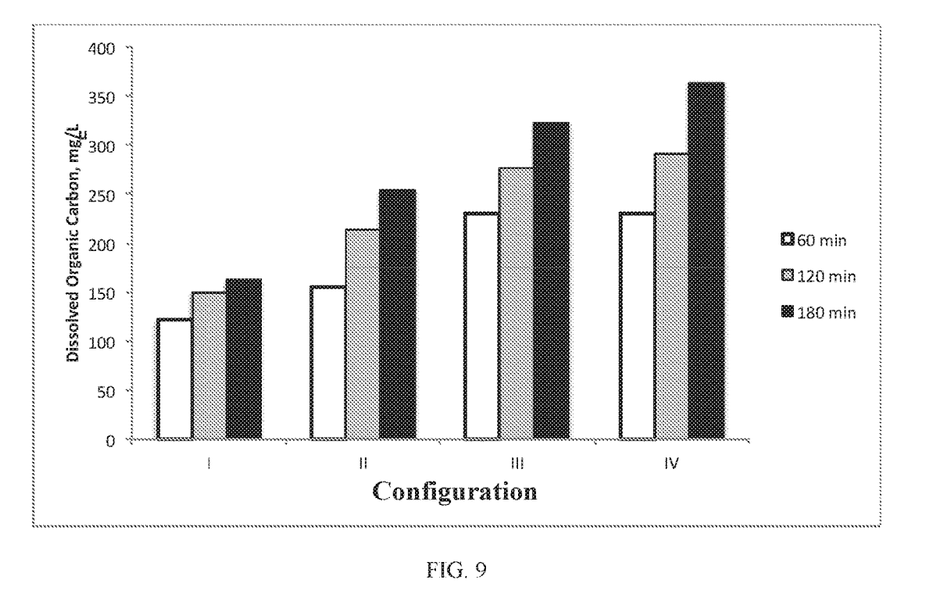
FIG. 9 shows a graph of dissolved organic carbon concentrations for different electrochemical treatment reactor configurations in accordance with some embodiments of the present invention.
Figure 10:
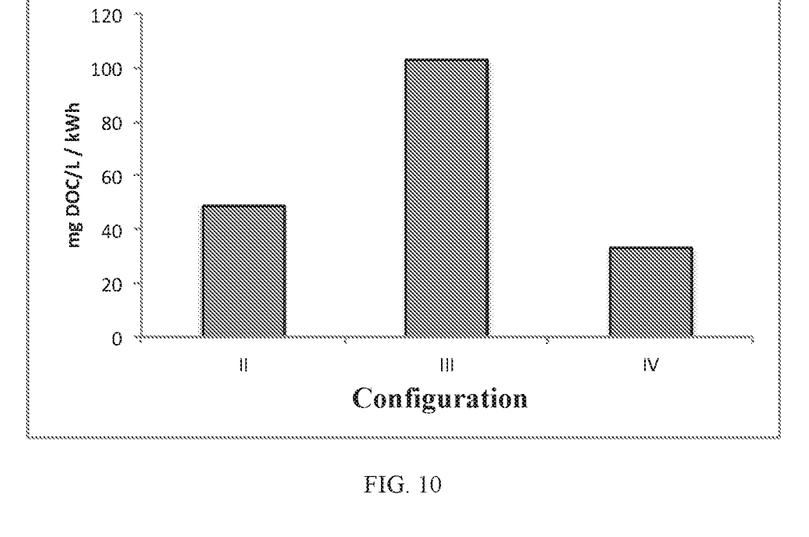
FIG. 10 shows a graph of energy-based efficiency of increasing bioreactivity and bioavailability for different reactor configurations in accordance with some embodiments of the present invention.

For each of these four configurations, subbituminous coal was processed and added to each of the stirred reactors with water. The electrical potentials were set at 50 V and three detention times were tested: 60, 120, and 180 min. The dissolved organic carbon (DOC) concentration was used as an indicator of the bioavailability of the coal carbon, where more oxidized carbon compounds may tend to be more hydrophilic and bioavailable. As shown in FIG. 9, the amounts of DOC from the coal increased with time in each reactor Configuration (I, II, III, and IV) and with the application of electrical potential to electrodes. The application of electrical potential increased DOC levels up to about 3.4 times that of the reactor configuration with no electrodes (Configuration I). FIG. 10 provides results showing the energy-based efficiency of increasing bioreactivity/bioavailability of coal for each reactor configuration. Configuration IV was the least energy efficient configuration, while Configuration III was more than 2 times efficient than both Configurations II and IV. Overall, the DOC concentration was only about 5% less in Configuration III than in Configuration IV. Additionally, the electrode configuration in Configuration III may be less complex than in Configuration IV. Based on these factors, Configuration III may be a good reactor configuration.

EXAMPLE 4

Figure 11:
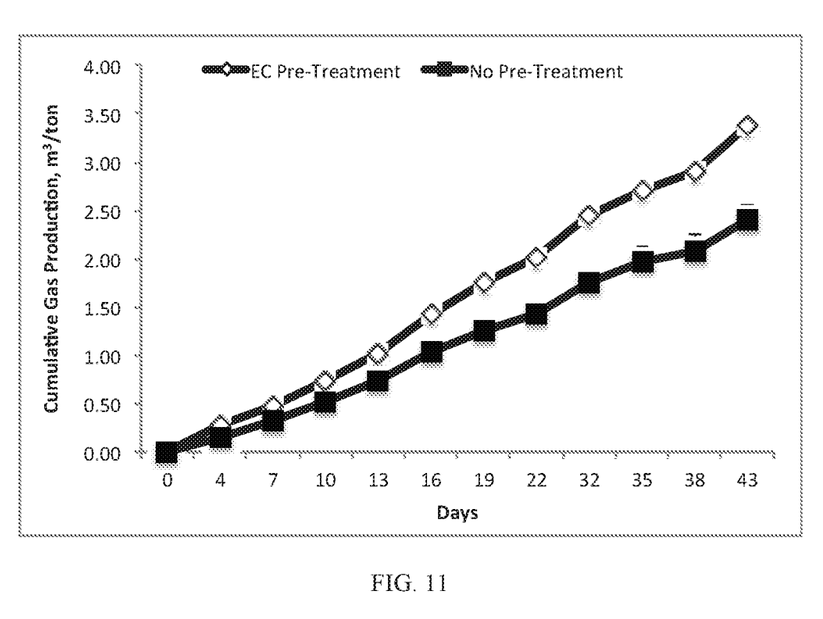
FIG. 11 shows a cumulative gas production in reactors for determining the bioreactivity of electrochemically treated coal versus untreated coal in accordance with some embodiments of the present invention.
Figure 12:
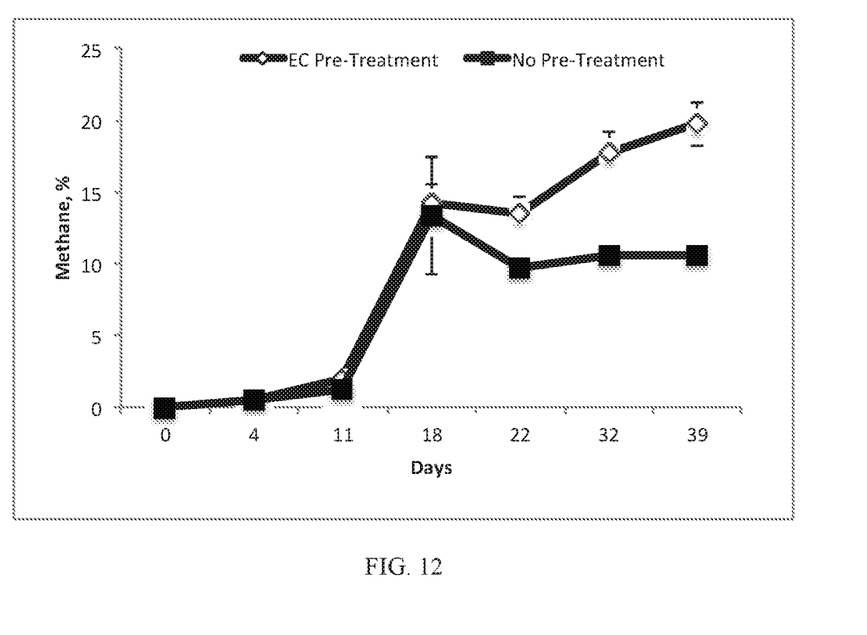
FIG. 12 shows a methane composition in reactors for determining the bioreactivity of electrochemically treated coal versus untreated coal in accordance with some embodiments of the present invention.

To test the bioreactivity of electrochemically-treated coal, reactors were set up in 120-mL bottles. Two sets of reactors consisted of either electrochemically (EC) treated coal or coal without any treatment. An anaerobic microbial consortium was added to each reactor, where total gas and methane production were indicators of bioreactivity of the coal. FIG. 11 shows the cumulative gas production in reactors for determining the bioreactivity of electrochemically-treated coal and untreated coal. FIG. 12 shows the methane composition in reactors for determining the bioreactivity of electrochemically-treated coal and untreated coal. The gas production in the reactors with the electrochemically (EC)-treated coal was consistently higher than the gas production in reactors with non-treated coal as shown in FIG. 11. After 43 days, the total gas production from reactors with EC-treated coal was about 55.44% higher than from the reactors with non-treated coal. The methane composition may correlate with the fermentative reactions, which were about 86.8% higher in reactors with EC-treated coal after 43 days as shown in FIG. 12. Overall, the results indicate that EC-treatment of coal increases the bioreactivity of coal.

As can be easily understood from the foregoing, the basic concepts of the present invention may be embodied in a variety of ways. It involves both bioreactivity techniques as well as devices to accomplish the appropriate bioreactivity. In this application, the bioreactivity techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "reactor" should be understood to encompass disclosure of the act of "reacting"—whether explicitly discussed or not—and, conversely, were there effectively disclosure of the act of "reacting", such a disclosure should be understood to encompass disclosure of a "reactor" and even a "means for reacting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Foreign Patent Documents:_PCT Publication No. WO 2011/142809, by applicant Oris Energy, Inc., publication date of Nov. 17, 2011.

Thus, the applicant(s) should be understood to have support to claim and make a statement of invention to at least: i) each of the electrochemical devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. *Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for enhancing bioreactivity comprising the steps of:
providing a carbonaceous geological material without microbial consortia;
adding said carbonaceous geological material to an electrochemical treatment;
creating acidic and basic pH levels, peroxides, and radicals in said electrochemical treatment;
increasing a biochemical reactivity, bioavailability, and water solubility of said carbonaceous geological material; and
creating a reactive carbonaceous geological material from said step of increasing said biochemical reactivity, bioavailability, and water solubility of said carbonaceous geological material.

2. The method as described in claim 1 and further comprising the step of processing said reactive carbonaceous geological material.

3. The method as described in claim 2 wherein said step of processing said reactive carbonaceous geological material comprises a step selected from a group consisting of biogasification, biomethanation, acidification, basification, biosolubilization, chemical production, biochemicals production, biofertilizer production, soil amendments, and organic fertilizer production of said reactive carbonaceous geological material.

4. The method as described in claim 1 wherein said acidic pH levels comprises between about 0 to about 6.99 pH and wherein said basic pH levels comprises between about 7.01 to about 14 pH.

5. The method as described in claim 1 wherein said peroxide and said radicals are selected from a group consisting of hydroxyl radicals, sulfate radicals, superoxide, organic radicals, inorganic radicals, hydrogen peroxide, inorganic peroxides, and organic peroxides.

6. The method as described in claim 1 wherein said carbonaceous geological material is selected from a group consisting of coal, peat, lignite, subbituminous coal, bituminous coal, anthracite, oil, shale, black shale, and organic sedimentary rocks.

7. The method as described in claim 1 wherein said electrochemical treatment comprises a water-based media, water-solid mixture media, and aqueous solution media.

8. The method as described in claim 1 wherein said step of increasing said biochemical reactivity, said bioavailability, and said water solubility of said carbonaceous geological material comprises a step selected from a group consisting of:
breaking down said carbonaceous geological material with an acidic pH;
transforming said carbonaceous geological material with an acidic pH;
swelling said carbonaceous geological material with a basic pH;
solubilizing said carbonaceous geological material with a basic pH;
breaking down said carbonaceous geological material with said peroxide;
transforming said carbonaceous geological material with said peroxide;
breaking down said carbonaceous geological material with said radicals; and
transforming said carbonaceous geological material with said radicals.

9. The method as described in claim 1 wherein said step of creating said acidic and basic pH levels, peroxide, and radicals comprises a step of simultaneously creating said acidic and basic pH levels, said peroxide and said radicals in said electrochemical treatment.

10. The method as described in claim 1 and further comprising a step of creating said reactive carbonaceous geological material without adding any acids bases, peroxide, or radicals to said carbonaceous geological material.

11. The method as described in claim 1 and further comprising a step of switching a polarity of an electrode in said electrochemical treatment.

12. The method as described in claim 1 wherein said step of increasing said biochemical reactivity and said bioavailability of said carbonaceous geological materials comprises a step of providing mineral reactions in said electrochemical treatment.

13. The method as described in claim 12 wherein said mineral reactions comprises minerals selected from a group consisting of iron oxides, iron sulfides, titanium dioxide, transition metal-containing substance, and any combination thereof.

14. The method as described in claim 1 wherein said electrochemical treatment occurs in an electrochemical reactor.

15. The method as described in claim 14 wherein said electrochemical reactor comprises at least four electrodes and at least two power supplies.

16. The method as described in claim 15 wherein two of said electrodes are connected to one power supply and the other two electrodes are connected to a second power supply.

17. The method as described in claim 14 wherein said electrochemical reactor comprises an electrochemical stirred-tank reactor.

18. The method as described in claim 14 wherein said electrochemical reactor comprises electrodes separated into dual chambers.

19. The method as described in claim 14 wherein said electrochemical reactor comprises electrodes in single chambered vessel.

20. The method as described in claim 14 wherein said electrochemical reactor comprises a direct current source and at least two electrodes.

21. The method as described in claim 20 wherein said at least two electrodes are constructed of a material selected from a group consisting of titanium, stainless steel, graphite, galvanized steel, copper, mixed metal oxides, metal oxides, carbon fiber, magnetite, and any combination thereof.

22. The method as described in claim 20 wherein said direct current source comprises an alternating current to direct current converter, alternating current to direct current transformer, solar panels, batteries, wind turbine, and fuel-powered generator.

23. The method as described in claim 1 and further comprising the step of adding said reactive carbonaceous geological material to soil.

24. The method as described in claim 1 and further comprising a step of biochemically treating said reactive carbonaceous geological material.

25. The method as described in claim 24 wherein said step of biochemically treating said reactive carbonaceous geological material comprises a step of adding reactive carbonaceous geological material to a biomass containing bioreactor.

26. The method as described in claim 25 wherein said biomass containing bioreactor comprises a condition selected from a group consisting of aerobic, facultative, anoxic, anaerobic, and any combination thereof.

27. A bioreactivity enhancing system comprising:
an electrochemical reactor;
a carbonaceous geological material without microbial consortia in said electrochemical reactor; and
acidic and basic pH levels, peroxides, and radicals in said electrochemical reactor capable of producing a reactive carbonaceous geological material with increased biochemical reactivity, bioavailability, and water solubility of said carbonaceous geological material.

28. The system as described in claim 27 wherein said acidic pH levels comprises between about 0 to about 6.99 pH and wherein said basic pH levels comprises between about 7.01 to about 14 pH.

29. The system as described in claim 27 wherein said peroxide and said radicals are selected from a group consisting of hydroxyl radicals, sulfate radicals, superoxide, organic radicals, inorganic radicals, hydrogen peroxide, inorganic peroxides, and organic peroxides.

30. The system as described in claim 27 wherein said carbonaceous geological material is selected from a group consisting of coal, peat, lignite, subbituminous coal, bituminous coal, anthracite, oil, shale, black shale, and organic sedimentary rocks.

31. The system as described in claim 27 wherein said electrochemical reactor comprises a water-based media, water-solid mixture media, and aqueous solution media.

32. The system as described in claim 27 wherein said reactive carbonaceous geological material comprises an element selected from a group consisting of:
broken down carbonaceous geological material with an acidic pH;
transformed carbonaceous geological material with an acidic pH;
swelled carbonaceous geological material with a basic pH;
solubilized carbonaceous geological material with a basic pH;
broken down carbonaceous geological material with said peroxide;
transformed carbonaceous geological material with said peroxide;
broken down carbonaceous geological material with said radicals; and
transformed carbonaceous geological material with said radicals.

33. The system as described in claim 27 wherein said acidic and basic pH levels, peroxide, and radicals comprise a simultaneously created acidic and basic pH levels, peroxide, and radicals in said electrochemical reactor.

34. The system as described in claim 27 wherein said reactive carbonaceous geological material is created without adding any acids, bases, peroxide, or radicals to said carbonaceous geological material.

35. The system as described in claim 27 wherein said electrochemical reactor is capable of switching a polarity of an electrode in said electrochemical reactor.

36. The system as described in claim 27 and further comprising mineral reactions in said electrochemical reactor.

37. The system as described in claim 36 wherein said mineral reactions comprises minerals selected from a group consisting of iron oxides, iron sulfides, titanium dioxide, transition metal-containing substance, and any combination thereof.

38. The system as described in claim 27 wherein said electrochemical reactor comprises at least four electrodes and at least two power supplies.

39. The system as described in claim 38 wherein two of said electrodes are connected to one power supply and the other two electrodes are connected to a second power supply.

40. The system as described in claim 27 wherein said electrochemical reactor comprises an electrochemical stirred-tank reactor.

41. The system as described in claim 27 wherein said electrochemical reactor comprises electrodes separated into dual chambers.

42. The system as described in claim 27 wherein said electrochemical reactor comprises electrodes in single chambered vessel.

43. The system as described in claim 27 wherein said electrochemical reactor comprises a direct current source and at least two electrodes.

44. The system as described in claim 43 wherein said at least two electrodes are constructed of a material selected from a group consisting of titanium, stainless steel, graphite, galvanized steel, copper, mixed metal oxides, metal oxides, carbon fiber, magnetite, and any combination thereof.

45. The system as described in claim 43 wherein said direct current source comprises an alternating current to direct current converter, alternating current to direct current transformer, solar panels, batteries, wind turbine, and fuel-powered generator.

46. The system as described in claim 27 wherein said reactive carbonaceous geological material comprises a soil amendment.

47. The system as described in claim 27 and further comprising a biochemically treated reactive carbonaceous geological material.

48. The system as described in claim 47 wherein said biochemically treated reactive carbonaceous geological material comprises reactive carbonaceous geological material added to a biomass containing bioreactor.

49. The system as described in claim 48 wherein said biomass containing bioreactor comprises a condition selected from a group consisting of aerobic, facultative, anoxic, anaerobic, and any combination thereof.

\* \* \* \* \*